(12) United States Patent
Helmich

(10) Patent No.: US 10,809,065 B2
(45) Date of Patent: Oct. 20, 2020

(54) METHOD FOR CREATING AN ENVIRONMENT MAP FOR AN AUTOMATICALLY MOVEABLE PROCESSING DEVICE

(71) Applicant: Vorwerk & Co. Interholding GmbH, Wuppertal (DE)

(72) Inventor: Martin Helmich, Duisburg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/068,217

(22) PCT Filed: Jan. 3, 2017

(86) PCT No.: PCT/EP2017/050055
§ 371 (c)(1),
(2) Date: Jul. 5, 2018

(87) PCT Pub. No.: WO2017/129379
PCT Pub. Date: Aug. 3, 2017

(65) Prior Publication Data
US 2019/0025061 A1    Jan. 24, 2019

(30) Foreign Application Priority Data
Jan. 28, 2016    (DE) .................. 10 2016 101 552

(51) Int. Cl.
*G01C 21/20*    (2006.01)
*G05D 1/02*    (2020.01)
(Continued)

(52) U.S. Cl.
CPC ............ *G01C 21/206* (2013.01); *A47L 9/009* (2013.01); *A47L 9/2852* (2013.01); *G01S 17/48* (2013.01);
(Continued)

(58) Field of Classification Search
CPC ..................... G01C 21/206; G05D 1/2074
See application file for complete search history.

(56) References Cited

U.S. PATENT DOCUMENTS 5,525,882 A * 6/1996 Asaka ................. G05D 1/0251
318/568.16
5,793,900 A * 8/1998 Nourbakhsh ............ G06T 7/571
382/263
(Continued)

FOREIGN PATENT DOCUMENTS

DE    10 2008 014 912 A1    9/2009
DE    10 2011 000 250 A1    7/2012

OTHER PUBLICATIONS

International Search Report of PCT/EP2017/050055, dated Apr. 25, 2017.

*Primary Examiner* — Nicholas K Wiltey
*Assistant Examiner* — Tiffany K Luu
(74) *Attorney, Agent, or Firm* — Collard & Roe, P.C.

(57) ABSTRACT

A method for creating an environment map for an automatically moveable processing device, in particular a cleaning robot, wherein a detection device of the processing device detects obstacles in the environment of the processing device and an environment map of the processing device is created based on detected obstacle data of the obstacles. At least one additional sensor detects obstacles in the environment of the processing device, wherein the distance of the additional sensor to the processing device is changed and wherein the obstacle data detected by the additional sensor is combined in the environment map with the obstacle data detected by the detection device of the processing device. In addition to the method for creating an environment map for an independently moveable processing device, the invention
(Continued)

also relates to a system for creating an environment map for an independently moveable processing device.

7 Claims, 5 Drawing Sheets

(51) Int. Cl.
    *G06F 16/29*     (2019.01)
    *A47L 9/00*     (2006.01)
    *A47L 9/28*     (2006.01)
    *G01S 17/48*     (2006.01)

(52) U.S. Cl.
    CPC .............. *G05D 1/024* (2013.01); *G05D 1/028* (2013.01); *G05D 1/0274* (2013.01); *G06F 16/29* (2019.01); *A47L 2201/04* (2013.01); *G05D 2201/0203* (2013.01); *G05D 2201/0215* (2013.01)

(56) References Cited

U.S. PATENT DOCUMENTS

| | | | |
|---|---|---|---|
| 6,944,542 B1* | 9/2005 | Eschenbach | G01C 21/165 |
| | | | 701/472 |
| 9,002,511 B1* | 4/2015 | Hickerson | G01S 17/026 |
| | | | 700/245 |
| 2005/0071046 A1 | 3/2005 | Miyazaki et al. | |
| 2005/0125098 A1 | 6/2005 | Wang et al. | |
| 2005/0171644 A1* | 8/2005 | Tani | A47L 9/009 |
| | | | 700/253 |
| 2007/0188615 A1 | 8/2007 | Beniyama et al. | |
| 2013/0226344 A1* | 8/2013 | Wong | G05D 1/024 |
| | | | 700/258 |
| 2014/0218517 A1 | 8/2014 | Kim et al. | |
| 2016/0150070 A1* | 5/2016 | Goren | H04W 4/029 |
| | | | 455/404.2 |
| 2017/0010100 A1* | 1/2017 | Takeuchi | G01C 21/28 |
| 2018/0259340 A1* | 9/2018 | Wakana | G01C 21/14 |

* cited by examiner

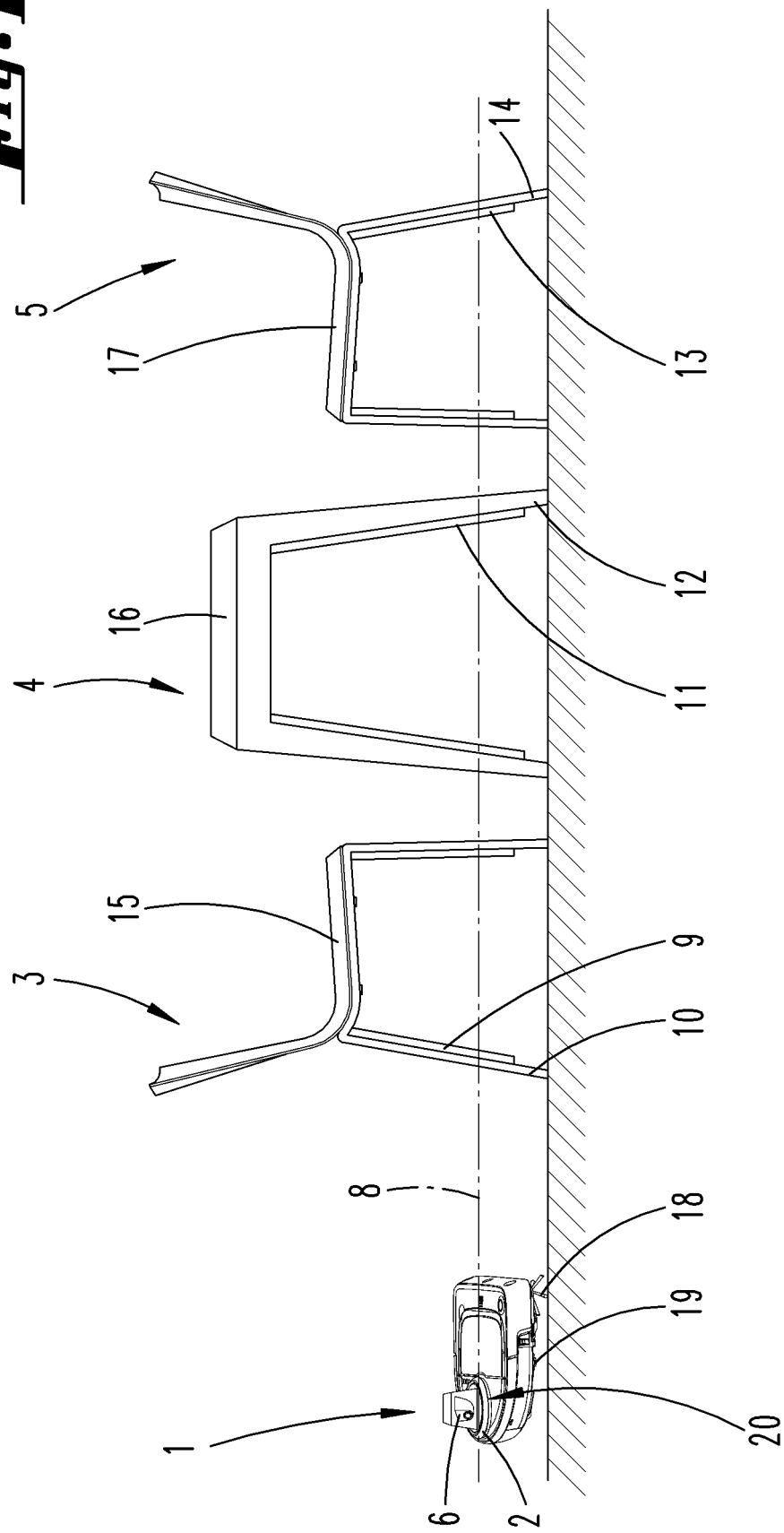

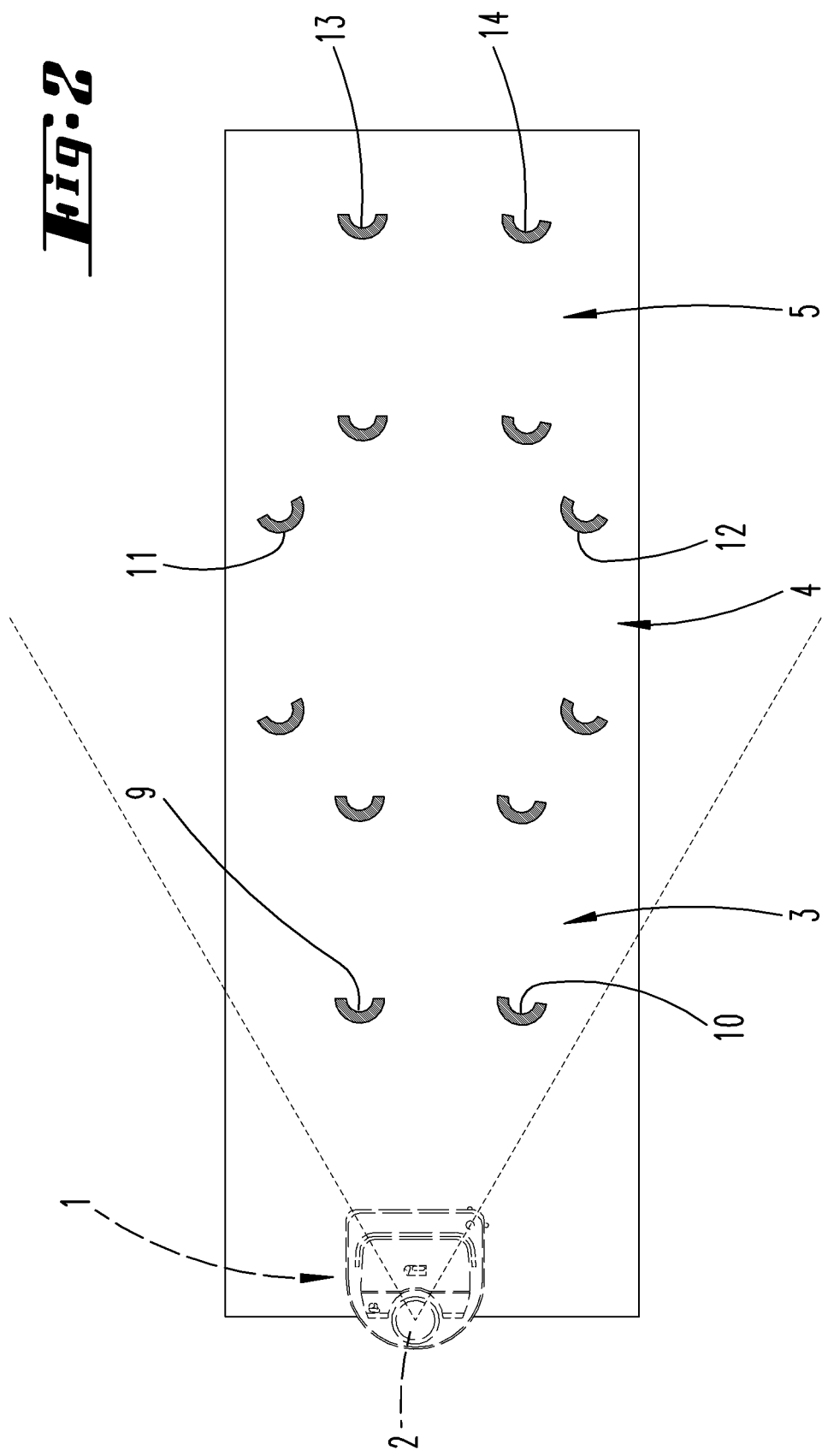

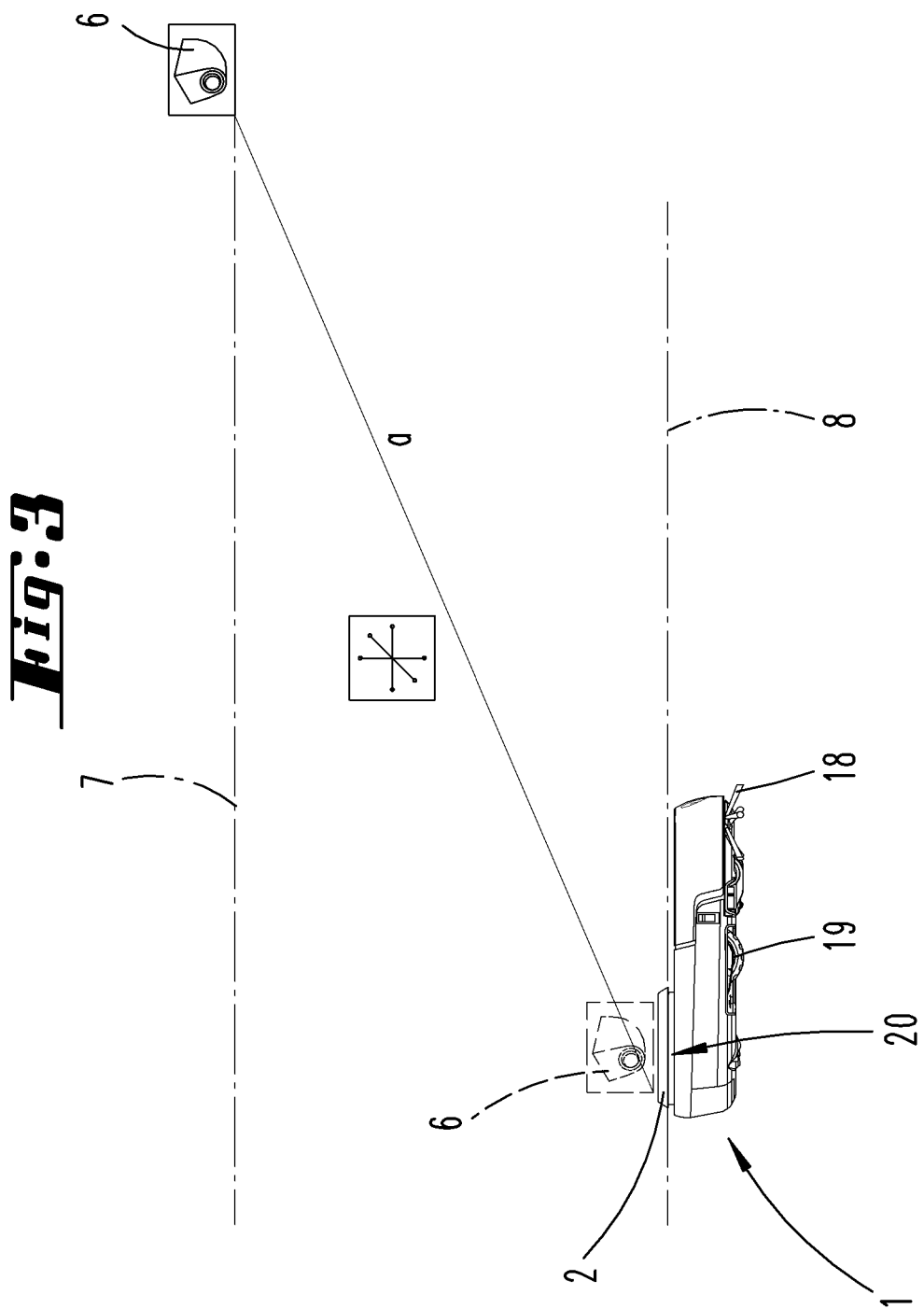

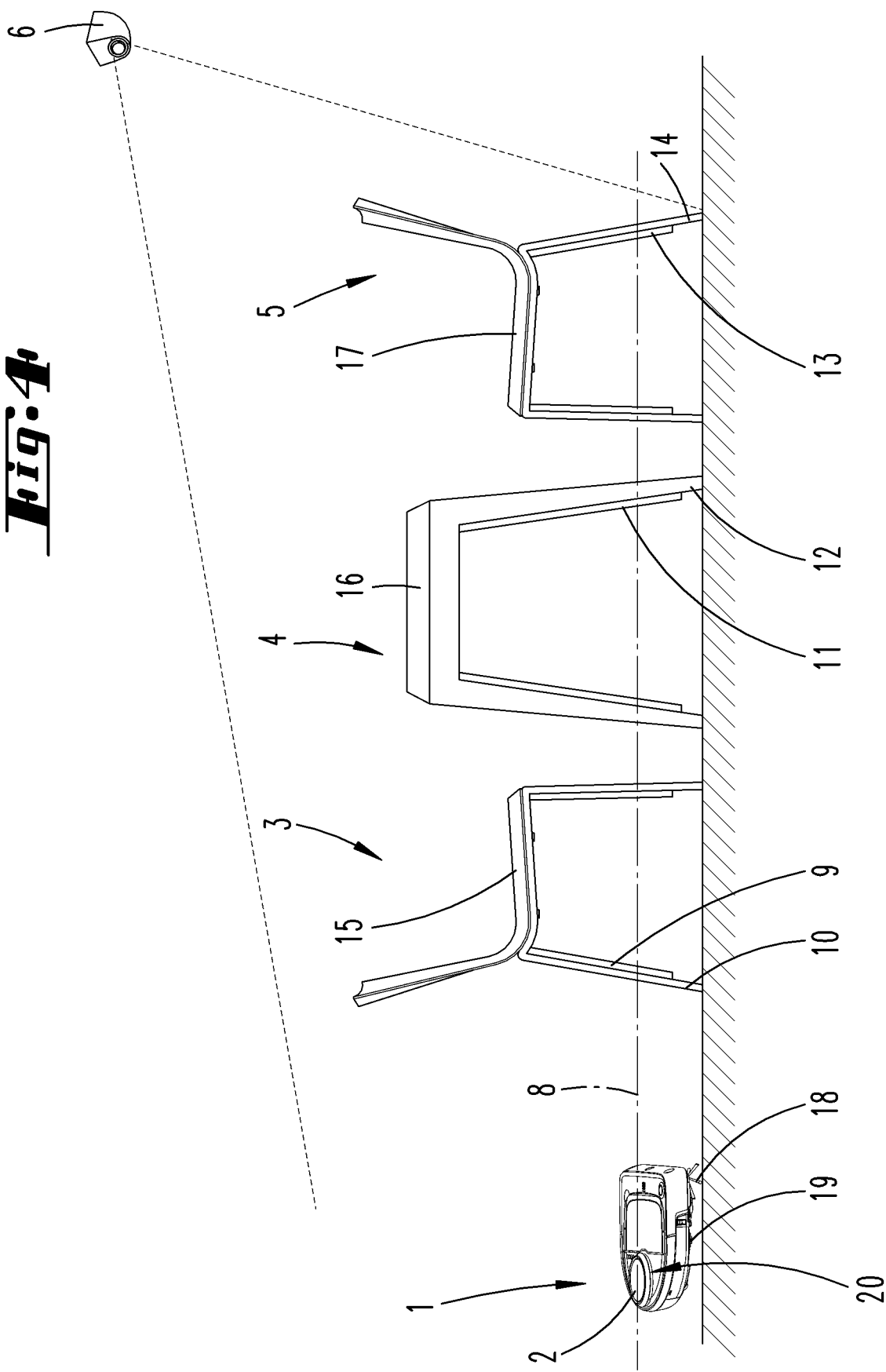

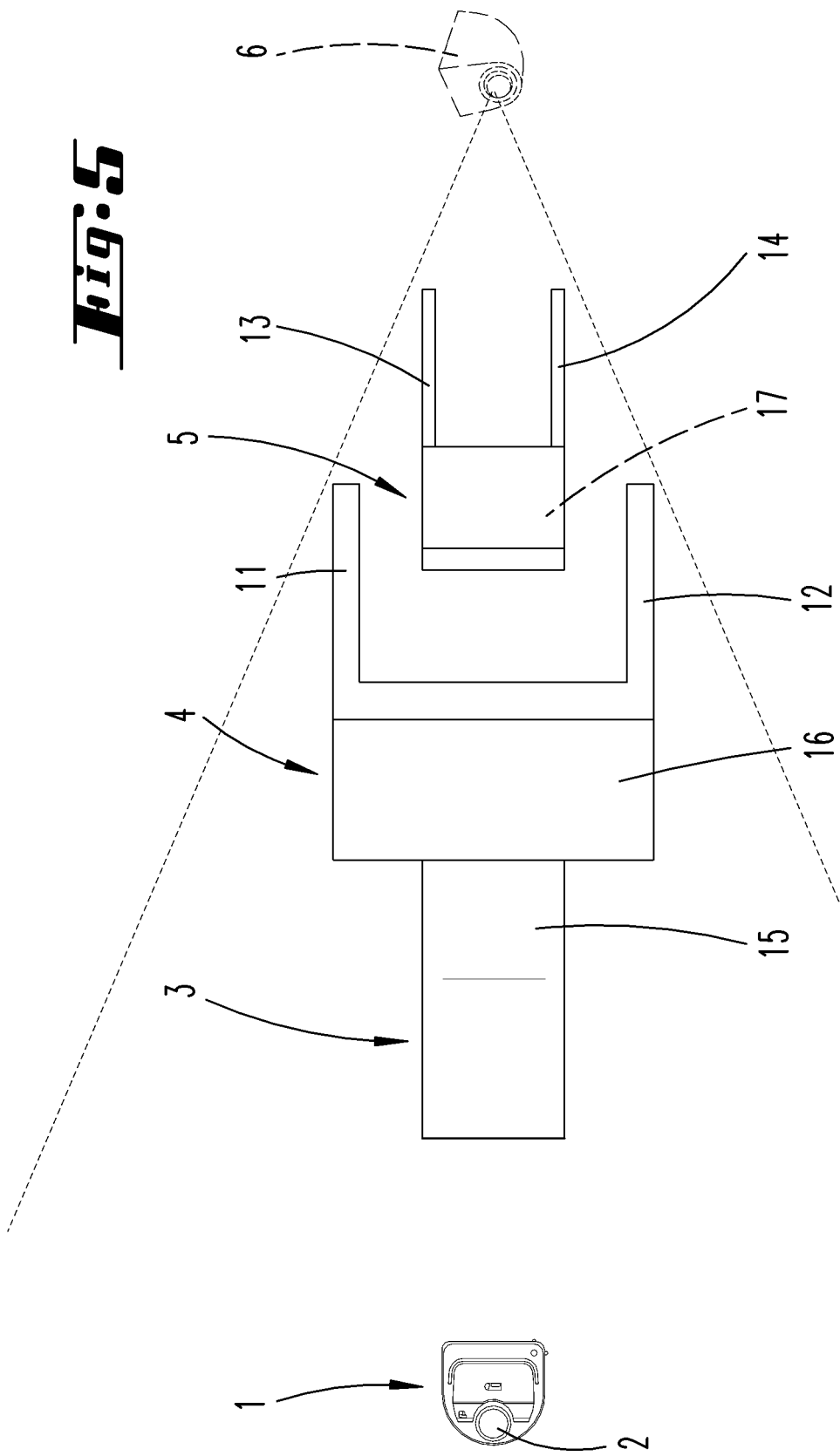

METHOD FOR CREATING AN ENVIRONMENT MAP FOR AN AUTOMATICALLY MOVEABLE PROCESSING DEVICE

CROSS REFERENCE TO RELATED APPLICATIONS

This application is the National Stage of PCT/EP2017/050055 filed on Jan. 3, 2017, which claims priority under 35 U.S.C. § 119 of German Application No. 10 2016 101 552.0 filed on Jan. 28, 2016, the disclosures of which are incorporated by reference. The international application under PCT article 21(2) was not published in English.

AREA OF TECHNOLOGY

The invention relates to a method for generating an environment map for an automatically movable processing device, in particular for a cleaning robot, wherein a detection device of the processing device detects obstacles in the environment of the processing device and generates an environment map of the processing device based on detected obstacle data of the obstacles.

The invention also relates to a system for generating an environment map for an automatically movable processing device, in particular a cleaning robot, wherein the system has a processing device with a detection device for detecting obstacles in the environment of the processing device.

PRIOR ART

Methods for generating an environment map for an automatically movable processing device are known.

For example, publications DE 10 2008 014 912 A1 and DE 10 2011 000 250 A1 disclose an automatically movable floor dust collector with an obstacle detector, which has an optical triangulation system with a light source and receiver unit. While traversing a room, the triangulation system measures the distance from an obstacle, which can serve as the basis for generating an environment map. Depending on a measured distance from an obstacle, the floor dust collector can react with reasonable maneuvering and evasive movements so as not to collide with the obstacle.

The triangulation system measures obstacles in a detection plane allocated to the triangulation device, which essentially is prescribed by the beam path from the light source to the receiver unit. If necessary, this detection plane can also be expanded in relation to a vertical direction, so that the detection plane encompasses a specific height range.

The obstacles measured by the detection device in the detection zone are difficult for a user of the processing device to interpret in an environment map, for example since the detection device detects the legs of a chair as separate obstacles, and not the chair as a whole.

SUMMARY OF THE INVENTION

Therefore, the object of the invention is to generate an environment map for the environment of the processing device that can be optimally, in particular intuitively, read by a user.

In order to achieve this object, the invention proposes that at least one additional sensor detect obstacles in the environment of the processing device, wherein the distance between the additional sensor and processing device is changed, and wherein the obstacle data detected by the additional sensor are combined with the obstacle data detected by the detection device of the processing device in the environment map.

According to the invention, the environment map is thus generated not only based on the obstacle data for the obstacles acquired by the detection device of the processing device, but also based on obstacle data detected by an additional sensor. By combining the obstacle data of the additional sensor and the obstacle data of the detection device of the processing device, the environment map can be generated from a larger plurality of obstacle data, and also various types of obstacle data. In this way, the respective obstacle in the environment map can be displayed in a way that most realistically reflects the visual perception of a user of the processing device. For example, the detection device of the processing device continues to detect the individual obstacle parts of an obstacle in the detection plane of the detection device, i.e., for example the legs of a chair, while the additional sensor detects the obstacle, for example the chair, as a whole (for example, as a perspective image), so that a combination of the overall obstacle data leads to a realistic representation of the obstacle in the environment map. Use can here be made either of just a single additional sensor or of several additional sensors, which in particular operate simultaneously. For example, when using just a single additional sensor, the latter can be modified for sequential detections in relation to its distance from the obstacles and/or from the processing device and/or in relation to its perspective. The modification can here be brought about by displacing the additional sensor or displacing the processing device, for example. For example, several additional sensors can be fixedly arranged inside of a room, in which the processing device is moving around.

It is proposed that the additional sensor detect the obstacles from a perspective deviating from the perspective of the detection device of the processing device, in particular in a top view of the obstacles. Detecting the obstacles from different perspectives makes it possible to compile various obstacle data for the obstacle, which in combination enable a realistic representation of the obstacle in the environment map. For example, four individual obstacles which together comprise the corners of a rectangle are recognized from a first perspective, for example the perspective of the detection device of the processing device. In addition, only individual obstacles of a closed surface (e.g., seat surface) are detected in the surface area between the only individual obstacles detected by the detection device from a second perspective, for example the perspective of the additional sensor, which when the obstacle data are combined makes it possible to infer a chair or at least a stool. A chair or stool can correspondingly be depicted in the environment map, so that the user can recognize a chair and also other pieces of furniture in the environment map without any further deliberation, and can guide the processing device to this exact location for a spot cleaning, for example.

In particular a top view of the obstacles offers a valuable perspective for the additional sensor, since closed surface areas can here be recognized that the detection device of the processing device cannot discern in its detection plane. In particular, the perspective of the additional sensor also makes it possible to determine a height of an obstacle, which provides information about whether the processing device can travel under this obstacle or not. The area to be mapped, for example a room in a home, is especially advantageously detected from varying perspectives by either mounting an additional sensor at different positions in chronological sequence or fixedly arranging several additional sensors that detect at the same time. The obstacle data obtained from various perspectives together with the obstacle data recorded by the processing device can then be combined to yield a virtual environment map, which allows both the best possible processing of the area by the processing device, to include under obstacles as well, and an optimal orientation of the user in the environment map.

It is further proposed that the additional sensor acquire image data of the environment of the processing device. The additional sensor here advantageously has a camera chip, for example a CCD chip or CMOS chip. The obstacle data can thus be acquired directly as image data, to also include in particular as RGB data containing color information, which can especially advantageously be integrated into the environment map of the processing device. At the same time, this also makes it possible to combine the obstacle data of the detection device with the image data of the additional sensor, for example to display the size and/or color of the processing device and/or the obstacles in the image. In addition, the imaged size can also be compared with the known dimensions of the processing device, for example, so as to be able to better estimate the size, in particular the height, of obstacles therefrom.

It is further proposed that a distance between the detection device of the processing device and the additional sensor be measured. The extent of this distance and potentially also spatial directional information between the processing device and additional sensor can be used to correlate the obstacle data of the detection device and the additional sensor. A position inside of the room determined via the detection device can thus be allocated to a position of the room measured by means of the additional sensor, so that various obstacle data for one and the same obstacle can be combined with each other. For example, combining information about four chair legs and information about a seat surface yields a chair with a defined position within the room. The distance between the detection device of the processing device and the additional sensor can here be measured in various ways, which will be described below.

In a first variant, the distance between the detection device and additional sensor is measured by the additional sensor, while the additional sensor is shifted to a desired position from the location of the detection device, wherein the distance is determined in particular by an acceleration sensor of the additional sensor. Before the additional sensor is installed in a desired position inside of the room, or alternatively also before any measurement is performed with the additional sensor, the additional sensor is shifted to the desired position proceeding from the detection device of the processing device, wherein the distance, and advantageously in particular also the spatial direction of the displacement are measured. For example, the processing device can have a receptacle for the additional sensor, in which the additional sensor is usually arranged on the processing device, and from which the additional sensor is released and shifted to the desired position for generating an environment map. In like manner, the processing device can also have a receptacle for several additional sensors, which can be shifted independently of each other. Alternatively, however, the additional sensor can also be an external sensor, which basically is not coupled with the processing device. Such an additional sensor is then initially shifted to the detection device of the processing device. The distance measurement is then begun, and the additional sensor is shifted from the detection device to the desired position inside of the room.

A second variant proposes that the distance be measured by means of the detection device of the processing device, in particular by means of a laser distance sensor, especially preferably by means of a triangulation measuring device. If the detection device of the processing device is one where a measurement is performed only within a single detection plane, the user can manually tilt the processing device and/or detection device until the additional sensor lies in the detection plane of the detection device. The angle of inclination of the processing device or detection device provides an indication about the spatial orientation of the additional sensor. Alternatively, however, the distance can be measured without any further measures by having the additional sensor be arranged in the detection plane of the detection device anyway, for example because the detection plane also extends in the vertical direction.

Another variant can provide that the distance between the detection device and additional sensor be determined based on a size of the processing device in an image acquired by means of the additional sensor. Since the dimensions of the processing device are known, the distance can be determined based on the depicted size of the processing device in the image recorded by the additional sensor. Furthermore, other path lengths within the image can be determined or at least estimated using the known dimensions of the processing device, for example distances between obstacles and the like.

It is proposed that the additional sensor be arranged in a plane over a detection plane of the detection device of the processing device relative to a vertical direction, in particular on a wall or ceiling of a room. For example, the perspective of the additional sensor corresponds to a bird's eye view of the obstacles arranged in the room. In combination with the detection plane of the detection device of the processing device close to the floor, a plurality of obstacle data from varying detection perspectives is thus obtained, which result in comprehensive information about the obstacles arranged in the room. In particular, these can on the one hand be obstacle data necessary for the processing device to travel under an obstacle, and on the other obstacle data that in particular allow a user of the processing device to find the obstacles, in particular furniture, within the environment map.

It is proposed that the additional sensor detect one or several of the following obstacle data: Number of obstacles, absolute and/or relative position of an obstacle, size of an obstacle, shape of an obstacle, color of an obstacle. The various obstacle data are here suitable for making the type of obstacles as recognizable to a user as possible. In particular the realistic shape and color of the obstacle provides the user with self-explanatory information about the obstacle, which need not be evaluated through his or her own mental transformation. For example, the size of the obstacle can be determined based on the size of the processing device in the image of the additional sensor. Furthermore, a relative position of an obstacle can be correlated in this way with another obstacle or other characteristic points within the room. For example, knowing the number of obstacles plays a part when the processing device detects a plurality of obstacles relative to its detection plane, which present themselves at least partially in the detection area of the additional sensor as obstacle parts of one and the same obstacle. In this way, chair legs detected by means of a detection device of the processing device can be allocated to a single chair, which is detectable as such in the detection area of the additional sensor, for example in a top view.

Finally proposed in addition to the method described above for generating an environment map for an automatically movable processing device is a system for generating an environment map for an automatically movable processing device, wherein this system has a processing device with a detection device for detecting obstacles in the environment of the processing device, and wherein the system further has at least one additional sensor spaced apart from the processing device for detecting obstacles in the environment of the processing device, wherein the system has an evaluation device, which has communication links with the detection device and additional sensor, and which is set up to combine obstacle data detected by the additional sensor with obstacle data detected by the detection device to yield a common environment map.

The detection device of the processing device here continues to be used for generating a layout of the area to be mapped, wherein obstacles in the detection plane of the detection device are detected. For example, the detection device can be a laser distance sensor, in particular a triangulation measuring device. Apart from the detection device of the processing device, the system has one or more additional sensors, for example one or more cameras. For example, the additional sensor can be fastened to the processing device by means of a receptacle arranged on the processing device, and detached from the processing device for generating an environment map. Furthermore, however, the additional sensor can also be an external sensor, for which the processing device has no receptacle. The additional sensor preferably has an acceleration sensor. The latter can be used to measure a distance (including amount and direction) between the detection device and the assembly site of the additional sensor. The additional sensor preferably has a communication device, which is used to transmit the obstacle data along with information about the measured distance to an evaluation device. The evaluation device can be incorporated in the processing device or also on some other device, such as a PC, a laptop or the like.

BRIEF DESCRIPTION OF THE DRAWINGS

The invention will be described in more detail below based on exemplary embodiments. Shown on:

FIG. 1 is a room area with a processing device and several obstacles,

FIG. 2 is the room area with obstacle data about the obstacles detected in a detection plane of the processing device, FIG. 3 is a system with a processing device and an additional sensor, FIG. 4 is the room area depicted on FIG. 1 with the processing device and additional sensor, FIG. 5 is the room area with obstacles detected by the additional sensor and processing device.

DESCRIPTION OF THE EMBODIMENTS

FIG. 1 shows a room area to be mapped, here for example part of a kitchen. A processing device 1, here designed as an automatically movable vacuuming robot, traverses the room area, and performs a cleaning task in the process. The processing device 1 has a detection device 2, for example which is designed as a triangulation measuring device. The detection device 2 is here in particular designed and set up in such a way that measurements can be performed within a detection plane 8 over an angular range of 360 degrees, i.e., all around the processing device. For example, the detection plane 8 here lies approx. 10 cm over the plane of a surface to be cleaned, which is traversed by the processing device 1. The housing of the processing device 1 has an opening 20 allocated to the detection device 2, through which a beam of light used for measuring can exit or enter. The triangulation measuring device functions in such a way that the beam of light emitted by the laser of the triangulation measuring device exits the processing device 1 through the opening 20, and scans the room area to be mapped over the 360 degree angular range. When the beam of light hits an obstacle 3, 4, 5, at least a portion is reflected and hits a sensor of the detection device 2, for example a CCD or CMOS chip. Depending on the distance between the detection device 2 and the obstacle 3, 4, 5 reflecting the beam of light, the reflected portion hits another position on the chip. The distance of the obstacle 3, 4, 5 can be determined based on this position.

Apart from the detection device 2, the processing device 1 has an additional sensor 6, for example which is held on the processing device 1 by a receptacle (not shown). For example, the additional sensor 6 is here placed on the processing device 1, specifically in a vertical direction above the detection device 2. The additional sensor 6 has a CCD or CMOS chip, along with a wireless communication device, which can be used to transmit obstacle data recorded by the additional sensor 6 to an evaluation device. For example, the evaluation device is here arranged in the processing device 1 itself (not shown).

In the usual manner, the processing device 1 also has wheels 19 for automatically moving the processing device 1 through the room area to be mapped. Brushes 18 here serve to support the cleaning effect.

Several obstacles 3, 4, 5 are arranged in the room area shown, specifically two chairs and a table. The obstacles 3, 4, 5 have several obstacle parts 9 to 14, which extend into the detection plane 8 of the detection device 2 of the processing device 1, as well as obstacle surface areas 15, 16, 17 that lie outside (specifically above) the detection plane 8 of the detection device 2.

FIG. 2 shows the obstacles 3, 4, 5 in terms of how the latter are detected by the detection device 2 of the processing device 1 in the detection plane 8. Since only the obstacle parts 9 to 14 of the obstacles 3, 4, 5 protrude into the detection plane 8, only they can be detected. By contrast, the obstacle surface areas 15, 16, 17 lying outside of the detection plane 8 are not perceived by the detection device 2. Only the obstacle parts 9 to 14 protrude into the detection plane 8 of the detection device 2. The latter are detected as partial circular arcs due to the variable measuring angle of the detection device 2. The depicted obstacle parts 9 to 14 are here the legs of the obstacle 3, 4, 5, specifically chair legs and table legs. FIG. 2 shows the processing device 1 for information purposes only. Of course, the latter is not detected by the detection device 2, and is thus illustrated with dashed lines. The obstacle data obtained by means of the detection device 2 contain information about the size and position of the obstacle parts 9 to 14 in the detection plane 8. However, the obstacle data contain no information about parameters outside of the detection plane 8, for example a different shape of the obstacles 3, 4, 5 or obstacle parts 9 to 14, in particular in a direction perpendicular to the detection plane 8. Furthermore, it also not known whether all or several of the obstacle parts 9 to 14 belong to the same obstacle 3, 4, 5, or whether each obstacle part 9 to 14 defines a separate obstacle 3, 4, 5.

FIG. 3 shows a system according to the invention with the processing device 1 and additional sensor 6. The additional sensor 6 is here shifted from an initial position on the processing device 1 (shown with dashed lines) to a desired position within the room area, here for example in a transitional area between a wall and a ceiling of a room. In this position, the additional sensor 6 is arranged in a plane 7 of the room area lying parallel to the detection plane 8. However, the detection area of the additional sensor 6 is not confined to the plane 7. Rather, the additional sensor 6 designed as a camera has a spatial detection area corresponding to a top view of the obstacles 3, 4, 5. In the position shown, the additional sensor 6 has a distance a from the detection device 2 of the processing device 1. This distance a has components in three spatial directions of the room area to be mapped. The distance a is measured by means of an acceleration sensor allocated to the additional sensor 6. While a user of the processing device 1 shifts the additional sensor 6 from the position on the processing device denoted by dashed lines to the position on the wall/ceiling of the room area, the movement sensor measures the direction and amount of distance a relative to the detection device 2. As a consequence, the position of the additional sensor 6 relative to the processing device 1 is known. Furthermore, the absolute position of the additional sensor 6 can be determined in the room area to be mapped if the position of the processing device 1 in the room area is correspondingly known.

FIG. 4 schematically shows the detection area of the additional sensor 6 in the room area to be mapped. As evident, the additional sensor 6 has a three-dimensional detection area, which detects the obstacles 3, 4, 5 arranged in the room area from the top right (relative to the illustration). The processing device 1 is also arranged in this detection area. As evident, the detection area of the additional sensor 6 and the detection plane 8 of the detection device 2 of the processing device 1 overlap each other. However, the additional sensor 6 also detects partial areas of the obstacles 3, 4, 5, which do not extend into the detection plane 8 or intersect the latter. For example, these include the obstacle surface areas 15, 16, 17, which are arranged essentially parallel to the detection plane 8. These obstacle surface areas 15, 16, 17 involve seat surfaces of the obstacle 3, 5 and a tabletop of the obstacle 4. Furthermore, the additional sensor 6 also detects at least several of the obstacle parts 9 to 14, which are not covered by the obstacle surface areas 15, 16, 17. As a consequence, the additional sensor 6 overall detects different obstacle data than the detection device 2 of the processing device 1. When combined, an abundance of varying obstacle data is obtained, which as a whole contribute to a more precise environment map of the room area that is easier for the user to read.

FIG. 5 shows the perspective of the additional sensor 6 on the room area intersected by the detection area. The detection area has the processing device 1 on the one hand, and the obstacles 3, 4, 5 on the other. The perspective of the additional sensor 6 correspondingly distorts the processing device 1 and obstacles 3, 4, 5. Furthermore, only those obstacle parts 9 to 14 under the obstacle surface areas 15, 16, 17 are visible which point in the direction of the additional sensor 6, and are not covered by the obstacles 3, 4, 5. As evident from FIG. 5, the additional sensor 6 obviously also detects the number of obstacles 3, 4, 5 within the detected room area, the at least perspectively distorted shape of the obstacles 3, 4, 5 and, in the case of a color sensor, the color of the obstacles 3, 4, 5 as well. The absolute and relative positions of the obstacles 3, 4, 5, the distances of the obstacles 3, 4, 5, the position of the processing device 1 and the distances between the obstacles 3, 4, 5 and the processing device 1 cannot be directly determined owing to the distorted perspective. However, a determination becomes possible when the additional sensor 6 measures from different positions within the room area to be mapped, or if a plurality of additional sensors 6 is used at various positions in the room.

In detail, the process of generating an environment map by means of the system consisting of the processing device 1 and additional sensor 6 is such that the user of the processing device 1 places the processing device 1 along with the additional sensor 6 arranged thereon in the room area to be mapped. He or she then separates the additional sensor 6 from the processing device 1, and shifts the additional sensor 6 to a desired position, here for example in a transitional area between the wall and ceiling of the room area to be mapped. While the additional sensor 6 is being shifted, the acceleration sensor allocated to the additional sensor 6 measures the distance a (amount and direction) between the additional sensor 6 and the detection device 2 of the processing device 1, specific to the initial position of the additional sensor 6 in which the latter was arranged on the processing device 1. The processing device 1 then traverses the interior of the room area to be mapped, and thereby measures distances from obstacles 3, 4, 5 or obstacle parts 9 to 14 of these obstacles 3, 4, 5 within the detection plane.

From its position on the wall or ceiling of the room area, the additional sensor 6 records an image of its detection area, which contains the obstacles 3, 4, 5 and processing device 1 as shown on FIG. 5. The additional sensor 6 is then shifted to different positions within the room area, and there also records a corresponding perspective image of the room area. This can be repeated as many times as desired, wherein a larger number of measuring positions simultaneously also increases the accuracy of the environment map generated from the obstacle data.

After detection by means of the additional sensor has concluded, the additional sensor 6 transmits the obstacle data contained in the recorded images to the evaluation device of the processing device 1. This takes place via wireless communication, in particular via a radio connection. The evaluation device combines the obstacle data recorded by means of the detection device 2 of the processing device 1 with the obstacle data detected by the additional sensor 6 to yield an environment map of the room area traversed by the processing device 1. The environment map here contains information about the positions of the obstacles 3, 4, 5 in the room area, the size of the obstacles 3, 4, 5, the shape of the obstacles 3, 4, 5 along with the color of the obstacles 3, 4, 5. As a consequence, the user of the processing device 1 can orient him or herself especially easily in the generated environment map, and recognizes the obstacles 3, 4, 5 charted therein directly by their type, for example whether the obstacle 3, 4, 5 is a chair or a table.

REFERENCE LIST

1 Processing device
2 Detection device
3 Obstacle
4 Obstacle
5 Obstacle
6 Additional sensor
7 Plane
8 Detection plane
9 Obstacle part
10 Obstacle part
11 Obstacle part
12 Obstacle part
13 Obstacle part 14 Obstacle part
15 Obstacle surface area
16 Obstacle surface area
17 Obstacle surface area
18 Brush
19 Wheel
20 Opening
a Distance

The invention claimed is:

1. A method for generating an environment map for an automatically movable processing device, wherein a detection device of the automatically movable processing device detects obstacles in the environment of the automatically movable processing device and an evaluation device generates an environment map of the processing device based on detected obstacle data of the obstacles, wherein at least one additional sensor detects obstacles in the environment of the automatically movable processing device, wherein the distance between the at least one additional sensor and automatically movable processing device is varied, wherein the obstacle data detected by the at least one additional sensor are combined with the obstacle data detected by the detection device of the automatically movable processing device in the environment map, wherein the varied distance between the detection device of the automatically movable processing device and the at least one additional sensor is measured continuously while the at least one additional sensor is shifted from the location of the detection device to a desired position, wherein the at least one additional sensor is an external sensor which is not coupled with the automatically movable processing device, and wherein during the step of measuring the variable distance continuously, the at least one additional sensor is initially shifted to the detection device of the automatically movable processing device, the distance measurement is then begun, and the at least one additional sensor is shifted from the detection device to the desired position inside of the room, wherein the environment map is generated based on a combination of the obstacle data for the obstacles acquired by the detection device of the automatically movable processing device and with obstacle data detected at the same time by the at least one additional sensor in order to display an obstacle, including a shape of the obstacle in a detection plane of the detection device and a shape of the obstacle in a detection area of the at least one additional sensor, in the environment map, wherein the detection device detects individual obstacle parts of the obstacle in the detection plane of the detection device, while the at least one additional sensor detects the obstacle as a perspective image, wherein a plurality of obstacles detected by the detection device of the automatically movable processing device relative to the detection plane of the detection device are presented as obstacle parts of one and the same obstacle in the detection area of the at least one additional sensor, and wherein the detection area of the at least one additional sensor is different from the detection plane of the detection device of the automatically movable processing device.

2. The method according to claim 1, wherein the at least one additional sensor detects image data of the environment of the detection device.

3. The method according to claim 1, wherein the varied distance is determined by means of an acceleration sensor of the at least one additional sensor.

4. The method according to claim 1, wherein the varied distance between the detection device of the automatically movable processing device and the at least one additional sensor is measured by means of the detection device of the automatically movable processing device.

5. The method according to claim 1, wherein the varied distance is determined by comparing a size of the automatically movable processing device in an image detected by means of the at least one additional sensor with an actual size of the automatically movable processing device.

6. The method according to claim 1, wherein the at least one additional sensor is arranged in a plane above the detection plane of the detection device of the automatically movable processing device relative to a vertical direction.

7. The method according to claim 1, wherein the at least one additional sensor detects one or several of the following obstacle data: Number of obstacles, absolute and/or relative position of an obstacle, size of an obstacle, shape of an obstacle, color of an obstacle.

* * * * *